Nov. 23, 1937.   O. DAHL ET AL   2,100,160
FISHING NET
Filed June 15, 1936   2 Sheets-Sheet 1
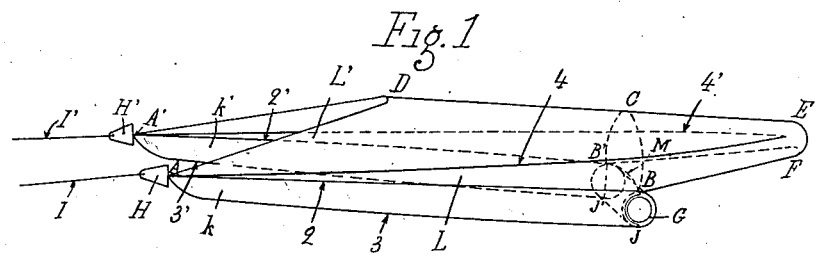
Fig. 1
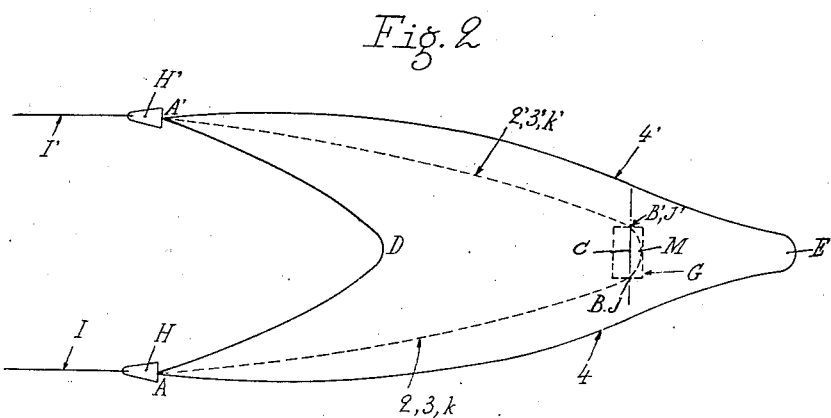
Fig. 2
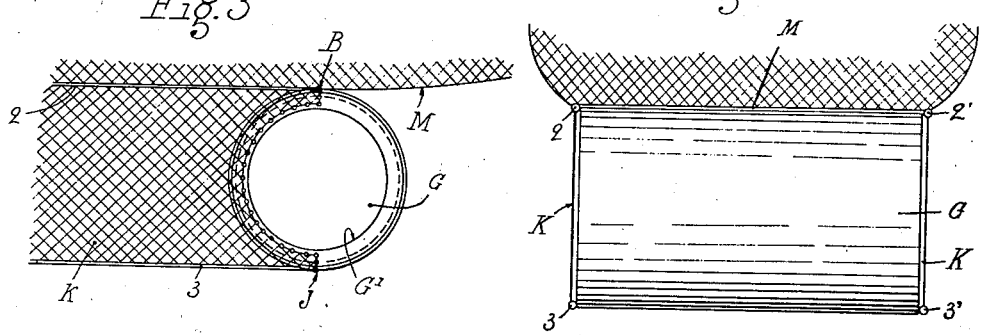
Fig. 3   Fig. 3ª
INVENTORS:
OSCAR DAHL
WILLIAM FORSYTH BLACK
BY: Ruege + Boyce
ATTORNEYS Nov. 23, 1937.  O. DAHL ET AL  2,100,160
FISHING NET
Filed June 15, 1936  2 Sheets-Sheet 2

INVENTORS:
OSCAR DAHL
WILLIAM FORSYTH BLACK
BY: Runge & Boyce
ATTORNEYS

Patented Nov. 23, 1937

2,100,160

UNITED STATES PATENT OFFICE 2,100,160

FISHING NET

Oscar Dahl and William Forsyth Black, La Rochelle, France, assignors to V. D. Limited, London, England Application June 15, 1936, Serial No. 85,316
In France June 26, 1935

6 Claims. (Cl. 43—9)

The present invention relates to upwardly swelling fishing nets and has for its object to devise a fishing net in which the upper sheet of the rear pocket is so constructed as to operate substantially at the level of the apex of the head rope, whereas the lower part of the net, which is preferably entirely deprived of belly, is maintained at a distance above the sea bottom by a sledge or like rigid structure, which also serves to prevent the escape of the fish under the mouth of the rear pocket.

Said sledge or rigid structure may have various forms (caterpillar, beam with iron straps and flexible curtain, etc.) but it preferably consists of a stationary or rotatable cylinder, whose axis is perpendicular to the direction of trawl.

In order that the upper sheet of the net shall operate at the level of the apex of the head rope without exerting upon said rigid structure a lifting force which would be liable to raise said structure off the ground, the portion of the net which is located above said sledge or the like is given a sufficient peripheral extent.

By this construction, the rear pocket will occupy its normal operating position without any tendency to raise the net off the ground, while all parts of the net which usually rub upon the ground are eliminated, thus avoiding tear and wear.

When the fish which have entered the net meet with the said rigid structure or with the clouds of mud which are raised by the friction of the same upon the ground, they will rise and enter the raised rear pocket, which will thus collect the fish alone, to the exclusion of all detritus.

The net preferably comprises on each side a raised traction rope which is attached at the front to a conical device, and at the rear to the upper part of the rigid structure. It further comprises a ground rope, which consists, on each side, of a cable which may be attached at one end to the front or the rear part of the conical device, and at the other end to the lower part of said rigid structure.

Between said traction ropes and the ground rope, which may be slack or stretched, are mounted suitable bands of netting which prevent the fish from escaping at the sides.

The accompanying drawings show by way of example several embodiments of the invention, as applied to a net without belly.

Fig. 1 is a perspective view of a first embodiment of the invention.

Fig. 2 is a corresponding plan view.

Fig. 3 is an enlarged elevational view of a cylindrical sledge.

Fig. 3ᵃ is a front view corresponding to Fig. 3.

Figure 4:
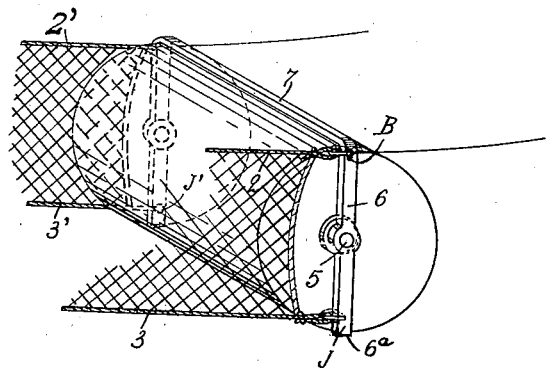

Fig. 4 is a perspective view of a modification of the cylindrical sledge.

Figure 5:
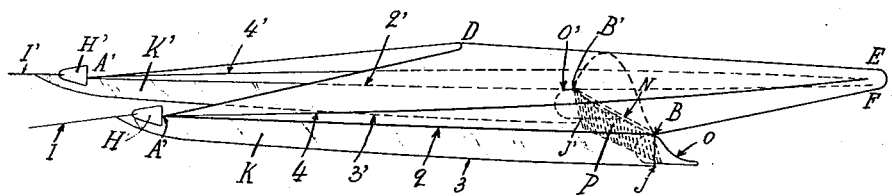

Fig. 5 is a view similar to Fig. 1, showing a modified embodiment of the invention, embodying a sledge of the so-called beam and irons type.

Figure 6:
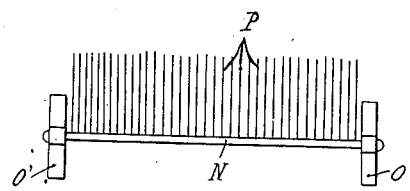

Fig. 6 is a plan view of said beam and irons sledge.

In the embodiment shown in Fig. 1, the net comprises an upwardly swelling upper sheet, bordered at the front by a head-rope ADA', provided with floats (not shown). The rear part CEFBB' of the net comprises the usual neck and the rear pocket, whose top sheet CE operates substantially at the level of the apex D of the head-rope, while the bottom part BB'F is held at a distance above the sea bottom by a sledge or like rigid structure; in the present instance, said rigid structure consists of a hollow cylinder G, whose axis is perpendicular to the direction of trawl.

The lower edges ABA'B' of the front upper sheet are secured respectively to traction ropes 2—2' which are attached at the front part in the rear of the conical devices H—H', the latter being drawn by towing cables I—I', connected with the otterboards and at the back part to suitable attaching devices B—B', located at the ends of a generatrix of the cylinder, situated approximately in the vertical plane containing the axis of the cylinder.

Lower ropes 3, 3' are mounted between the rear ends of the conical devices H—H' and attaching devices J—J', located at the ends of a generatrix of the cylinder, substantially opposite the generatrix B—B'; said lower ropes 3—3' form the ground rope of the net and are adapted to operate in contact with the ground. Wings or curtains K—K' are mounted between the traction ropes 2, 2' and the ground rope 3, 3'. The rear edges of said curtains are conformed with the outline of the cylinder and are attached, for instance, to curved angle-bars G', adapted to reinforce said cylinder.

Protecting side cables 4—4', which are long enough to allow lateral bulging of the net, are attached to the net between the points A—A' and the end of the rear pocket, and serve to limit any eventual tearing of the net.

In this embodiment, the lower ropes AJ—A'J' form a stretched ground rope, their length being equal to the length of the corresponding traction ropes AB—A'B', measured from the point A to the plane of the generatrices BB'—JJ'.

The back part of the net, in its upper half BFECB', forms the continuation of the front upper sheet. Its lower part, which is provided with a small belly, is attached to a small ground rope BMB' resting upon the top of the cylindrical sledge.

The advantages of this net are as follows.

No part of the net will rub upon the ground, and thus all wear is eliminated, except for the ground ropes 3, 3' which rub upon the ground, but may be given a great strength. Although these ropes 3, 3' are stretched, they are capable of yielding, should they catch upon an obstacle, due to the fact that cylinder G may pivot through a certain angle about its axis.

Should however the ground ropes 3, 3' break, the ropes 2 will prevent the destruction of the net, and if these ropes should yield to a particularly violent force, the tearing of the net will be limited to the wings L—L', between the ropes 2 and the wing cables 4, due to the presence of these latter, and the front upper sheet will remain intact.

The tendency of the bellyless nets to rise off the ground is effectively eliminated in the net according to the invention by the fact that the top part BECB' of the back of the net is free to operate substantially at the level of the apex D of the head-rope.

The polishing which is caused by the friction of the cylinder on the ground will show, according to the place where it occurs, what is the position of equilibrium of the system during trawling, and will thus permit the adjustment of the cables 2 and 3 in order to obtain the optimum position of equilibrium.

The cylindrical form of the sledge facilitates the passage over obstacles, without complicating the operations to be performed by the crew. In practice, said cylinder will consist of thin sheet metal (about 3 mm. thickness); it may be perforated, if desired, in order to reduce the weight. By way of example, for a trawl net of normal size, the cylinder will have a diameter of about 0.50 m. and a length of about 0.70 m. Such a cylinder, suitably reinforced at the part which is subject to wear and also at the ends by curved angle-pieces, will weigh, including the parts for attaching the cables, from 30 to 50 kgs.

Another advantage of the aforesaid device consists in the fact that the rear pocket of the net is subjected to a reduced strain, and will not rub upon the bottom, so that its meshes will open more widely, thus allowing the escape of the small immature fish.

In the modified construction shown in Fig. 4, the roller G, instead of sliding on the ground, is rotatably mounted in a bracket. For this purpose, its ends are provided with journals 5 (which may consist of the ends of a rod extending through the cylinder pivoted in the cheeks 6 of a strap, whose central part 7 lies adjacent the periphery of the cylinder). As in Figs. 3 and 3a, BB'JJ' represent the attaching points of the cables 2—3.

This device has the advantage of reducing the resistance to forward travel; the ends of the cheeks 6 are preferably extended as shown at 6ª, in order to verify the position of the apparatus during the fishing operation, by examining the polished part rubbing on the ground.

In the embodiment shown in Figs. 5 and 6, the bottom part BB'F of the net is maintained above the sea bottom by a rigid structure comprising a horizontal beam N which is attached to the front edge B—B' of the part BB'F, and iron straps OO' of conventional type.

In order to avoid the escape of the fish under the beam N, this latter may have suspended therefrom an inclined curtain P, consisting of chains, whose lower ends are free or are attached to a cable forming a ground rope; the said curtain may also consist of a piece of net fabric or other flexible, semi-rigid or rigid device, whose lower end rubs upon the ground, thus raising clouds of mud, while clearing stones, detritus, and obstacles on the bottom.

The iron straps OO' are preferably closed up by pieces of net fabric or wire netting.

The net shown in Fig. 5 is of the loose or free ground rope type, the two cables 3—3' having a greater length than the traction ropes 2—2' to which the edges of the front upper sheet are attached. Each ground rope 3—3' is attached at the front end to the towing cable I—I', in front of the corresponding conical device HH', and in the rear to the corresponding iron strap OO', at a certain distance above the ground.

Having now described our invention what we claim as new and desire to secure by Letters Patent is:

1. An upwardly swelling net comprising a covering sheet, a head rope along the front edge of said covering sheet, a rear pocket connected to said covering sheet and having its front edge at a considerable distance to the rear of said head rope, the top sheet of said rear pocket being positioned to operate substantially at the level of the apex of said head rope, and means below said rear pocket for keeping the whole bottom sheet of said rear pocket above the sea bottom and for preventing the escape of the fish under the mouth of said rear pocket.

2. An upwardly swelling net comprising a covering sheet, a head rope along the front edge of said covering sheet, a rear pocket connected to said covering sheet and having its front edge at a considerable distance to the rear of said head rope, the top sheet of said rear pocket being positioned to operate substantially at the level of the apex of said head rope, and a rigid structure below said rear pocket for keeping the whole bottom sheet of said rear pocket above the sea bottom and for preventing the escape of the fish under the mouth of said rear pocket.

3. An upwardly swelling net comprising a covering sheet, a head rope along the front edge of said covering sheet, a rear pocket connected to said covering sheet and having its front edge at a considerable distance to the rear of said head rope, the top sheet of said rear pocket being positioned to operate substantially at the level of the apex of said head rope, and a cylindrical sledge arranged with its axis at right angles with the longitudinal axis of the net and below said rear pocket for keeping the whole bottom sheet of said rear pocket above the sea bottom and for preventing the escape of the fish under the mouth of the said rear pocket.

4. An upwardly swelling net comprising a covering sheet, a head rope along the front edge of said covering sheet, a rear pocket connected to said covering sheet and having its front edge at a considerable distance to the rear of said head rope, the top sheet of said rear pocket being positioned to operate substantially at the level of the apex of said head rope, and a rotary cylindrical sledge arranged with its axis at right angles with the longitudinal axis of the net and below said rear pocket for keeping the whole bottom sheet of said rear pocket above the sea bottom and for preventing the escape of the fish under the mouth of said rear pocket.

5. An upwardly swelling net comprising a covering sheet, a head rope along the front edge of said covering sheet, a rear pocket connected to said covering sheet and having its front edge at a considerable distance to the rear of said head rope, the top sheet of said rear pocket being positioned to operate substantially at the level of the apex of said head rope, a transverse strap and a cylindrical sledge rotatably arranged in said strap below said rear pocket for keeping the whole bottom sheet of said rear pocket above the sea bottom and for preventing the escape of the fish under the mouth of said rear pocket, a pair of raised traction ropes attached at the rear to the upper part of said strap, and a ground rope, consisting of two lower cables attached at the rear to the bottom part of said strap, conical devices connected with the front ends of said traction ropes and lower ropes, and pieces of netting extending between said traction ropes and lower ropes.

6. A sledge for use in the construction of fishing nets, consisting of a hollow cylindrical roller having upper and lower attaching means for connection with the traction ropes and the ground rope of the net.

OSCAR DAHL.
W. F. BLACK.